US 8,359,178 B2

(12) United States Patent
Rowe et al.

(10) Patent No.: US 8,359,178 B2
(45) Date of Patent: Jan. 22, 2013

(54) METHOD AND APPARATUS FOR IDENTIFYING ERRONEOUS SENSOR OUTPUTS

(75) Inventors: Eric Rowe, Albuquerque, NM (US); Mike Gruer, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 216 days.

(21) Appl. No.: 12/398,041

(22) Filed: Mar. 4, 2009

(65) Prior Publication Data

US 2010/0228512 A1 Sep. 9, 2010

(51) Int. Cl.
*G01D 18/00* (2006.01)

(52) U.S. Cl. .......... 702/85; 702/104; 702/193; 702/199

(58) Field of Classification Search .................. 702/104, 702/85, 103, 182, 189, 193, 199
See application file for complete search history.

(56) References Cited

U.S. PATENT DOCUMENTS

| | | | |
|---|---|---|---|
| 4,385,699 A | 5/1983 | Ashina | |
| 4,488,189 A | 12/1984 | Axmear et al. | |
| 4,518,917 A | 5/1985 | Oates et al. | |
| 4,606,316 A | 8/1986 | Komurasaki | |
| 4,712,427 A | 12/1987 | Peters | |
| 5,049,838 A | 9/1991 | Voyce | |
| 5,136,512 A | 8/1992 | Le Borne | |
| 5,175,438 A | 12/1992 | Ikeda | |
| 5,253,173 A * | 10/1993 | Drobny et al. | .................. 701/45 |
| 5,272,483 A | 12/1993 | Kato | |
| 5,371,718 A | 12/1994 | Ikeda et al. | |
| 5,479,161 A | 12/1995 | Keyes et al. | |
| 5,621,776 A | 4/1997 | Gaubatz | |
| 5,715,178 A * | 2/1998 | Scarola et al. | ................. 702/116 |
| 5,906,655 A | 5/1999 | Fan | |
| 5,923,286 A | 7/1999 | Divakaruni | |
| 6,029,111 A | 2/2000 | Croyle | |
| 6,201,763 B1 | 3/2001 | Bourgeois et al. | |
| 6,335,905 B1 | 1/2002 | Kabel | |

(Continued)

FOREIGN PATENT DOCUMENTS

EP 0522862 A1 1/1993

(Continued)

OTHER PUBLICATIONS

Massa, D. Choosing an Ultrasonic Sensor for Proximity or Distance Measurement Part 1: Acoustic Considerations, Sensors [online], Feb. 1999 [retrieved on Feb. 2, 2011]. Retrieved from the Internet: <URL: http://www.sensorsmag.com/sensors/acoustic-ultrasound/choosing-ultrasonic-sensor-proximity-or-distance-measurement-825>.*

(Continued)

*Primary Examiner* — Michael Nghiem
*Assistant Examiner* — Paul D Lee
(74) *Attorney, Agent, or Firm* — Shumaker & Sieffert, P.A.

(57) ABSTRACT

A method for identifying erroneous sensor outputs is provided. The method includes obtaining a first plurality of samples from a sensor over a period of time. A mean of the plurality of samples is determined. A first additional sample from the sensor at a time subsequent to times that the first plurality of samples were obtained is also received. A divergence of the first additional sample from the mean is determined. The first additional sample is identified as erroneous when the divergence is greater than a threshold.

20 Claims, 4 Drawing Sheets

U.S. PATENT DOCUMENTS

| | | | |
|---|---|---|---|
| 6,466,514 B1 | 10/2002 | Kabel | |
| 6,526,160 B1 | 2/2003 | Ito | |
| 6,556,925 B1 | 4/2003 | Mori et al. | |
| 6,678,394 B1 | 1/2004 | Nichani | |
| 7,204,123 B2 | 4/2007 | McMahan et al. | |
| 7,219,856 B2 | 5/2007 | Watts et al. | |
| 7,275,425 B2 | 10/2007 | Buck et al. | |
| 7,343,232 B2 | 3/2008 | Duggan et al. | |
| 7,388,809 B2 | 6/2008 | Inouchi et al. | |
| 2002/0065628 A1 | 5/2002 | McMahan | |
| 2002/0099481 A1 | 7/2002 | Mori | |
| 2003/0154052 A1 | 8/2003 | Samata et al. | |
| 2004/0118972 A1 | 6/2004 | Ouellette et al. | |
| 2004/0174292 A1 | 9/2004 | Isaji | |
| 2004/0208375 A1* | 10/2004 | Gupta et al. | 382/217 |
| 2004/0267444 A1 | 12/2004 | Coatantiec et al. | |
| 2005/0040985 A1 | 2/2005 | Hudson et al. | |
| 2006/0071817 A1 | 4/2006 | Greene | |
| 2006/0229534 A1* | 10/2006 | Chang et al. | 600/587 |
| 2007/0032951 A1 | 2/2007 | Tanenhaus et al. | |
| 2007/0069083 A1 | 3/2007 | Shams et al. | |
| 2008/0077284 A1 | 3/2008 | Swope | |
| 2008/0082294 A1 | 4/2008 | Pihlaja et al. | |
| 2008/0114544 A1 | 5/2008 | Liu et al. | |
| 2008/0181280 A1 | 7/2008 | Wang et al. | |
| 2008/0195304 A1 | 8/2008 | Krishnaswamy | |
| 2008/0239279 A1 | 10/2008 | Krishnaswamy | |
| 2010/0152933 A1* | 6/2010 | Smoot et al. | 701/16 |

FOREIGN PATENT DOCUMENTS

| | | |
|---|---|---|
| JP | 63046961 | 2/1988 |
| WO | 2006137049 A1 | 12/2006 |
| WO | 2007124014 | 11/2007 |

OTHER PUBLICATIONS

Honeywell , "Accelerex RBA Accelerometer ", Jan. 2001, Publisher: Honeywell International Inc.

Honeywell Aerospace, "HG1930 MEMS IMU", "available at http://www51.honeywell.com/aero/common/documents/myaerospacecatalog-documents/Missiles-Munitions/HG1930_Datasheet.pdf", Jun. 2006, Publisher: Honeywell Aerospace, Published in: Phoenix, AZ.

Maybeck, Peter S., "Stochastic Models, Estimation, and Control", "available at http://www.cs.unc.edu/~welch/media/pdf/maybeck_ch1.pdf", 1979, pp. 1-16, vol. 1, Publisher: Academic Press, Published in: NY.

Microstrain, "Detailed Specifications for 3DM-GX1", "available at http://www.microstrain.com/pdf/3DM-GX1%20Detailed%20Specs%20-%20Rev%201%20-%20070723.pdf", 2006, Publisher: Microstrain, Published in: Williston, VT.

Microstrain, "3DM-GX1 Gyro Enhanced Orientation Sensor", "available at http://www.microstrain.corri/pdf/3DM-GX1%20datasheet%20Rev%201.pdf", 2006, Publisher: Microstrain, Published in: Williston, VT.

Senscomp, Inc., "Mini-A PB Ultrasonic Transducer", "available at http://www.senscomp.com/specs/Mini-A%20PB%20spec.pdf", Dec. 16, 2006, Publisher: Senscomp Inc., Published in: Livonia, MI.

Welch, G. and G. Bishop, "An Introduction to the Kalman Filter,", "available at http://www.cs.unc.edu/~tracker/media/pdf/SIGGRAPH2001_CoursePack_08.pdf", 2001, Publisher: SIGGRAPH 2001, pp. 1-50,Course 8, ACM Inc.

European Search Report from corresponding EP Application No. 09179539.3, mailed Jul. 6, 2010, 3 pages.

Communication from corresponding EP Application No. 09179539.3, mailed Aug. 16, 2010, 4 pages.

Reply to communication from the Examining Division, for EP Application No. 09179539.3, dated Dec. 8, 2010, 11 pages.

Basu et al., "Automatic outlier detection for time series: an application to sensor data," Knowl Inf Syst (2007) 11(2): 137-154.

Examination Report from European application No. 09179539.3, dated Oct. 8, 2012, 8 pp.

Reply to communication from the Examining Division, for counterpart EP Application No. 09 179 539.3, dated Nov. 29, 2012, 9 pages.

* cited by examiner

METHOD AND APPARATUS FOR IDENTIFYING ERRONEOUS SENSOR OUTPUTS

GOVERNMENT LICENSE RIGHTS

The U.S. Government may have certain rights in the present invention as provided for by the terms of Government Contract # MDA972-01-9-0018.

CROSS-REFERENCE TO RELATED APPLICATIONS

This application is related to the following co-pending United States patent application which is hereby incorporated herein by reference:

U.S. patent application Ser. No. 12/332,481 (entitled "APPARATUS AND METHOD FOR UNMANNED AERIAL VEHICLE GROUND PROXIMITY DETECTION, LANDING AND DESCENT") and filed on Dec. 11, 2008.

BACKGROUND

Data received from a sensor measuring a real world physical quantity likely contains accurate measurement data as well as erroneous data. Sensors often generate erroneous data due to noise in the measurement environment or other variables affecting the sensor measurement.

One type of sensor that is prone to erroneous data outputs is an acoustic proximity sensor. Acoustic proximity sensors provide output data that relates to the distance from the sensor to an object. Acoustic proximity sensors operate by generating an acoustic pulse and measuring the time from when the acoustic pulse is sent to when a return pulse (echo) is received. When sent, the acoustic pulse propagates away from the sensor through the air, water, or other liquid medium until reaching a solid object. When the pulse hits the solid object, a return pulse is reflected back towards the sensor. The time between when the initial pulse is sent and when the return pulse is received is used to determine the distance from the sensor to the object.

Along with the return pulse, the sensor also receives multipath signals and noise. Multipath signals are caused when the acoustic pulse echoes off of surfaces other than the object to which the distance is being measured. For example, a portion of the acoustic pulse may reflect directly back to the sensor, however, other portions of the acoustic pulse may reflect off of the object in directions not directly back toward the sensor. These other reflected signals may then reflect off of other objects and return to the sensor. These signals are referred to as multipath signals. The multipath signals are detected by the sensor, but the time between when the acoustic pulse was sent and when the multipath signal(s) is received does not represent an accurate distance to the object. Thus, the data output from the sensor based on the multipath signal received is erroneous data that does not represent an accurate distance to the object. Furthermore, environmental noise may also be interpreted by the sensor as a return signal. Thus, environmental noise may also cause erroneous data to be output from the sensor. Additionally, other factors may cause erroneous data output.

SUMMARY

In one embodiment, a method for identifying erroneous sensor outputs is provided. The method includes obtaining a first plurality of samples from a sensor over a period of time. A mean of the plurality of samples is determined. A first additional sample from the sensor at a time subsequent to times that the first plurality of samples were obtained is also received. A divergence of the first additional sample from the mean is determined. The first additional sample is identified as erroneous when the divergence is greater than a threshold.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments of the present invention.

DETAILED DESCRIPTION

The present disclosure is directed towards methods and systems for identifying erroneous sensor outputs. Erroneous outputs are identified by comparing output data to a mean of a portion of the previous output data. A sliding window is used to select the previous output data from which the mean is determined. For example, in one embodiment, as output data is obtained from the sensor, a currently obtained output data is compared to the mean of the immediately preceding output data. If the current output data diverges from the mean by more than a threshold, the current output data is identified as erroneous. If the current output data diverges by less than or equal to the threshold, the output data is likely valid and is not identified as erroneous. Divergence between the output data and a threshold, as well as determination of a threshold is discussed in more detail below. The output data from the sensor is then sent to a controller which uses the data to control a mechanism. Either in the controller or in processing prior to the controller, the erroneousness of the data is taken into account. For example, in one embodiment, once output data is identified as erroneous, the output data may be discarded such that the erroneous output data is not used in further processing of the data. In other embodiments, other actions (discussed in more detail below) may be taken to account for the erroneous output data.

Figure 1:
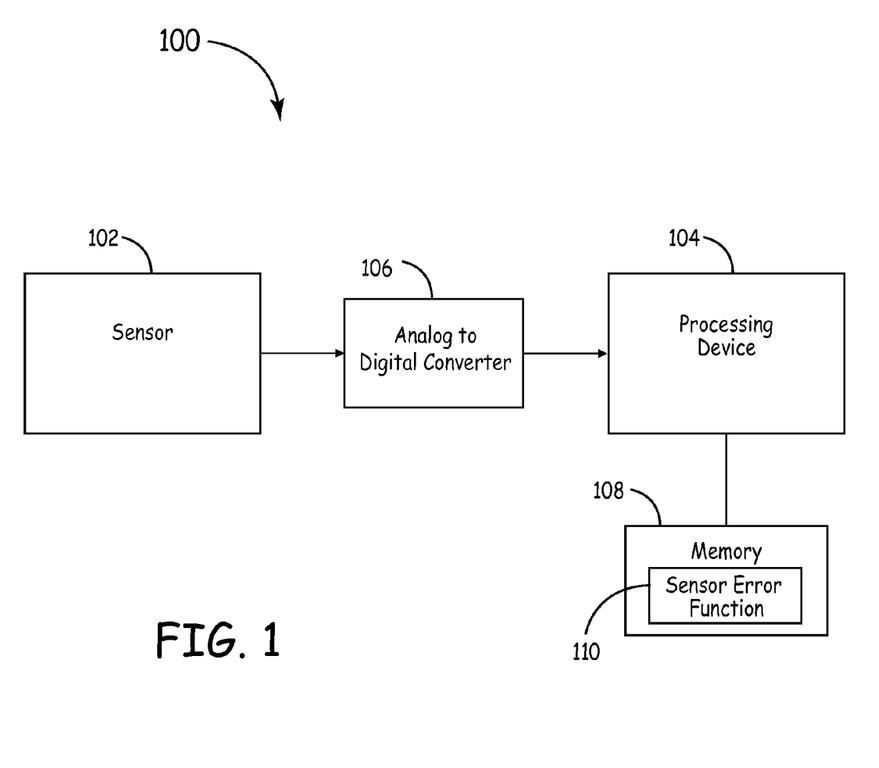
FIG. 1 is block diagram of one embodiment of a system for identifying erroneous sensor outputs.

FIG. 1 illustrates one embodiment of a system 100 for identifying an erroneous sensor output. System 100 includes a sensor 102 communicatively coupled to an analog to digital converter (ADC) 106 which is communicatively coupled to a processing device 104. Processing device is coupled to an associated memory 108 housing program code 110 for identifying erroneous sensor outputs. Sensor 102 obtains measurements from the surrounding environment and outputs data to processing device 104. Processing device 104 analyzes the data according to instructions provided by program code 110 to identify erroneous data from sensor 102.

In the embodiment shown in FIG. 1, sensor 102 is an analog sensor that outputs a voltage that is relative to the measurement obtained by sensor 102. ADC 106 converts the analog voltage into digital samples and sends the digital samples to processing device 104. In another embodiment, sensor 102 is a digital sensor which directly outputs digital samples to processing device 104.

Figure 2:
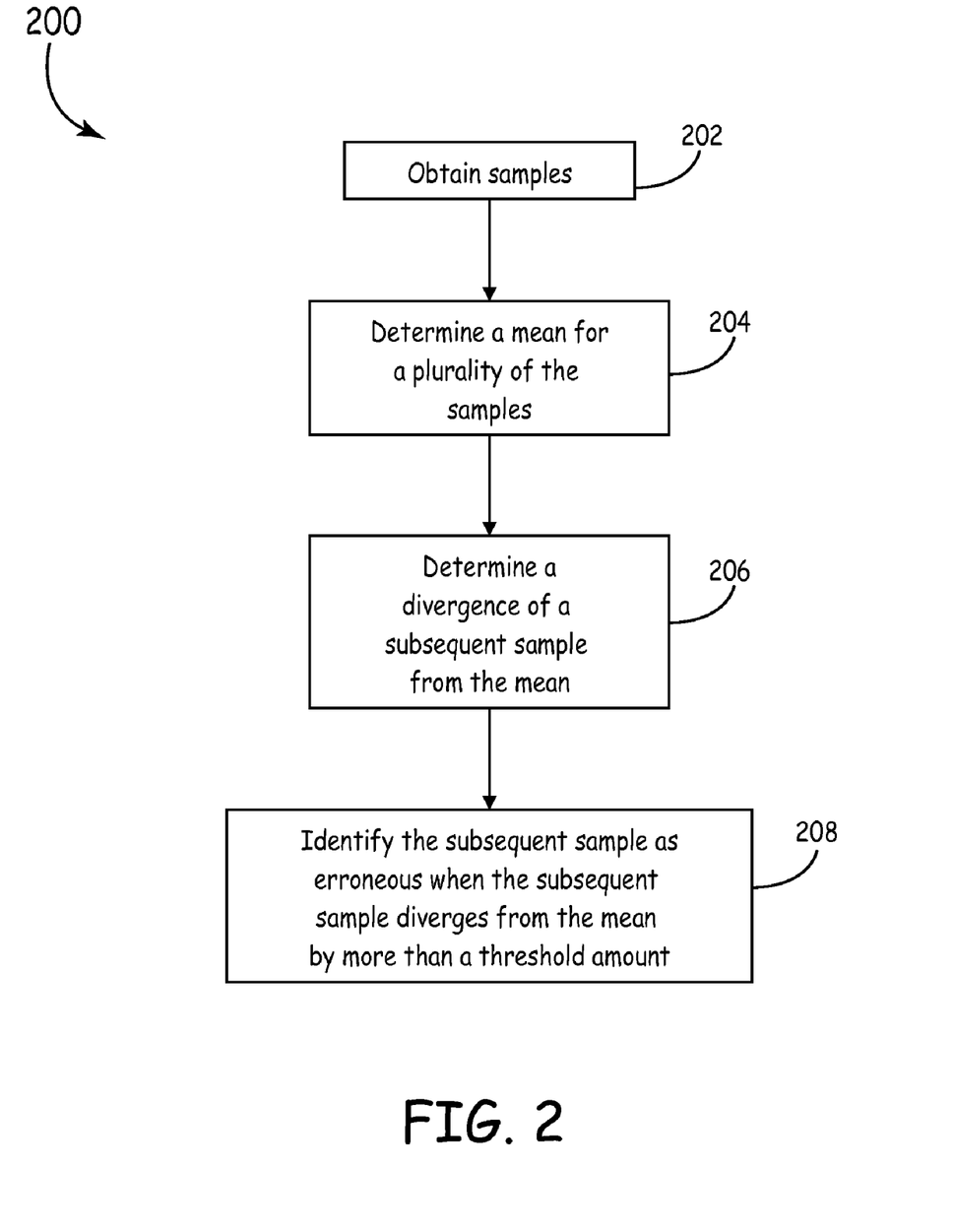
FIG. 2 is flow chart illustrating one embodiment of a method for identifying erroneous sensor outputs.

Processing device 104 receives samples obtained by sensor 102 and identifies erroneous samples. FIG. 2 illustrates one embodiment of a method 200 for identifying erroneous samples. In method 200 processing device 104 compares each sample to a mean of a plurality of samples obtained by sensor 102 previous in time to the time in which sensor 102 obtained the sample being compared.

First, the data within the samples is obtained by sensor 102. The data within samples comprises measurements obtained by sensor 102 of the environment around sensor 102. These measurements are output as digital samples to processing device 104 either directly by sensor 102 or through ADC 106 as mentioned above (202). During normal operation of system 100, sensor 102 continually obtains data and samples are continually provided to processing system 104. In one embodiment, samples are provided to processing system 104 every 1/10 of a second. For each sample, processing system 104 determines a mean of a portion of the previously obtained samples (204). Processing system 104 then compares the mean to the current sample to determine a divergence of the current sample from the mean (206). When the divergence of the current sample from the mean is greater than a threshold divergence, processing system 104 identifies the current sample as erroneous (208). When the current sample is less than or equal to the threshold divergence, processing system 104 does not identify the current sample as erroneous.

In one embodiment, the threshold is selected based on empirical data. The threshold is selected high enough to ensure that a sufficiently low number of accurate samples are incorrectly identified as erroneous. The threshold is selected low enough to ensure that a sufficiently high number of actual erroneous samples are identified as erroneous.

In one embodiment, the divergence between a sample and the mean is calculated as a coefficient of variance of the sample relative to the mean. The coefficient of variance is a dimensionless measure of the relative variability of the sample, designed to allow comparisons of variation for samples with different average sizes. The coefficient of variance is calculated by taking the standard deviation over 'n' samples, normalized by the mean of those 'n' samples. Here, the threshold is a selected coefficient of variance that is determined from empirical data. In one embodiment, the coefficient of variance is selected as 5. In another embodiment, a simple difference between the sample and the mean is used as the threshold.

Figure 3:
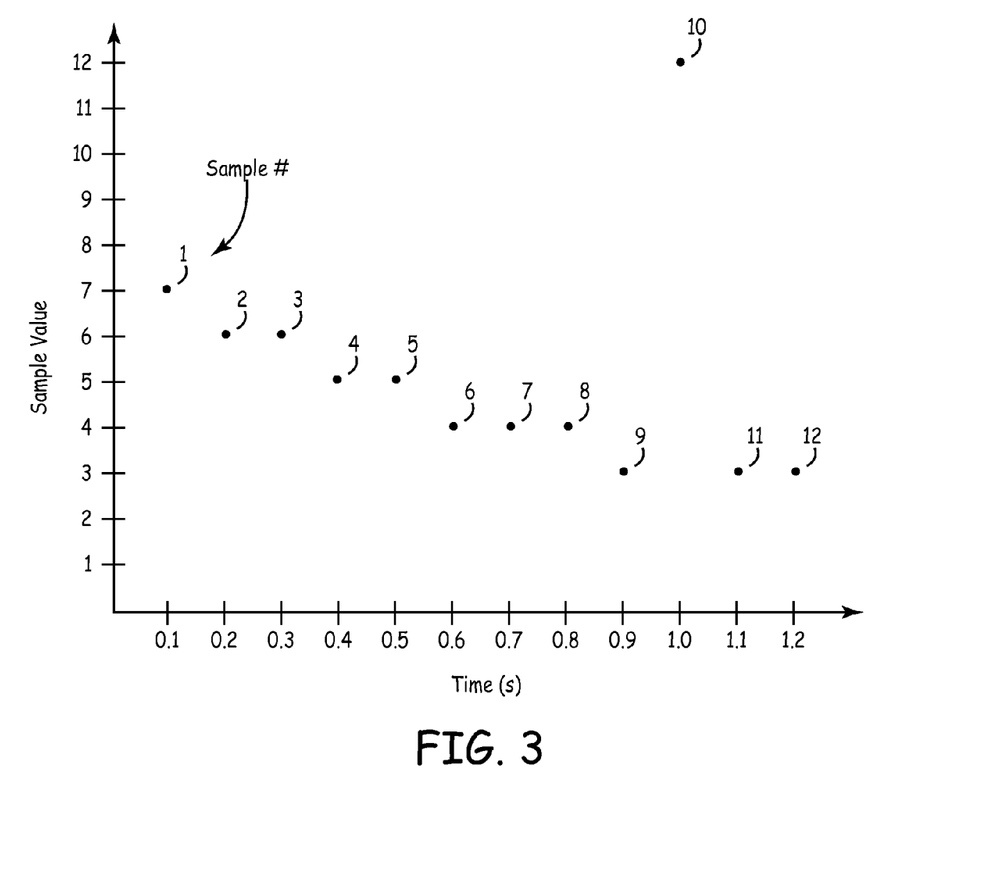
FIG. 3 is a timing diagram illustrating one embodiment of a plurality of samples from a sensor.

FIG. 3 illustrates one example of a timing diagram illustrating a plurality of samples that are processed as described in method 200. For this example, processing device receives samples 1-10 (202), wherein the data of sample 1 is measured by sensor 102 at time=0.1 s; the data of sample 2 is measured at time=0.2 s, the data of sample 3 is measured at time=0.3 s; and so on until time=1.2 s where the data of sample 12 is measured. Assume sample 10 is being analyzed by processing device 104 to determine if the sample is erroneous. In this example embodiment, processing device 104 compares sample 10 to the mean of the three samples that immediately precede sample 10 in time. Thus, processing device 104 determines the mean of samples 7, 8, and 9. As shown in FIG. 3, samples 7, 8, and 9 represent values 4, 4, and 3 respectively. Thus, the means of samples 7, 8, and 9 is 3⅔.

Once the mean of the previous samples is obtained, sample 10 is compared to the mean to determine a divergence of sample 10 from the mean. This divergence from the mean is compared to a threshold divergence to determine whether sample 10 is an erroneous sample.

As mentioned above, each sample received from sensor 102 is analyzed to determine whether the sample is erroneous. As each subsequent sample is analyzed, processing device 104 determines a mean based on a plurality of samples in a sliding window. For example, referring back to FIG. 3, assuming as described above, processing system 104 has completed analyzing sample 10, and processing system 104 uses a sliding window to determine from which samples the mean is determined. During processing of sample 10, the sliding window contains samples 7, 8, and 9. After sample 10 is analyzed as described above, sample 11 is received and analyzed by processing device 104. For sample 11 the sliding window "slides" from including samples 7, 8, and 9 used for sample 10 to including samples 8, 9, and 10. Processing device 104, therefore, determines the mean from samples 8, 9, and 10 and compares sample 11 to this mean. The divergence of sample 11 from this mean is then compared to the threshold to determine whether sample 11 contains erroneous data. Continuing with this example, processing device 104 analyzes each sample in this way such that each sample is compared to the mean of three samples immediately previous in time.

In one embodiment, processing device 104 does not analyze samples during startup of sensor 102. This is because the first samples have no previous samples from which to obtain a mean and/or sensor 102 may be going through an initialization procedure.

Once a sample is identified as erroneous one or more actions may be taken based on the erroneous determination. For example, in one embodiment, each erroneous sample is flagged by processing device 104. Flagging the erroneous samples enables the samples to be discarded or otherwise processed differently than non-erroneous samples during further processing. For example, flagged samples may be given less weight during further processing than un-flagged samples. In another embodiment, once a sample is identified as erroneous, the sample is discarded. Here, for example, the sample is replaced with a sample equal to the mean of the previous samples. In one embodiment, a sample identified as erroneous is discarded for further processing except for calculation of a mean for the erroneous determination of subsequent samples. Thus, the sample is used in the sliding window to determine a mean for successive samples, but the sample is not used in any further processing of the samples.

In yet another embodiment, each erroneous sample is replaced. For example, in one embodiment, a sample and hold algorithm is used to replace an erroneous sample with the last valid (non-erroneous) sample obtained. In another embodiment, the erroneous sample is replaced with a predicted value based on a slope of the previous n valid samples obtained.

In one embodiment, identification of erroneous samples from sensor 102 is performed on the raw data output from sensor 102. Thus, the data output from sensor 102 has not been filtered or otherwise altered prior to analyzing by processing device 104. Furthermore, in one embodiment, the samples are analyzed by processing system 104 in real time, such that data is output from sensor 102 and a sample is received by processing system 104, processing system 104 analyzes the data as the data is received.

Once the samples have been processed by processing system 104, the samples are provided to a controller (not shown) for controlling the operation of a mechanism. The controller causes the mechanism to make a physical movement based on the data received within the samples. As described above, in one embodiment, processing system 104 has discarded all erroneous data, thus the commands from controller and the actions of the mechanism are based only on non-erroneous data. In other embodiments, the erroneous data is given less weight, thus controller may provide a different command to move mechanism based on an erroneous data point as compared to the same value in a non-erroneous data point. In one embodiment, the mechanism is a thruster for an aircraft. In another embodiment, the mechanism is a brake for a wheeled vehicle. In yet another embodiment, the mechanism is a flap for an aircraft.

Although in the example described above, three samples are used to determine the mean, in other embodiments, other numbers of samples are used to determine the mean. For example, in one embodiment 25 samples are used to determine the mean. The number of samples used to determine the mean is selected based on system and application criteria. For example, when sensor 102 is used in a setting in which the physical quantity that is measured by sensor 102 varies rapidly, it may be advantageous to use a lower number of samples to calculate the mean. This is because when the samples vary rapidly, a larger number of samples may include samples from when the sensor was measuring a different physical quantity and thus, the mean may not reflect the actual mean of the more current measurements. Likewise, when sensor 102 is used in a situation in which the physical quantity that is measured by sensor 102 does not vary rapidly, it may be advantageous to use a higher number of samples to calculate the mean. This is because a larger number of samples may provide a more accurate mean.

Additionally, although as described above, the samples used to determine the mean are the samples immediately preceding in time the sample being compared, in other embodiments, earlier preceding samples are used. For example, in one embodiment, when determining whether sample 10 is erroneous, samples 5, 6, and 7 are used to determine the mean. Furthermore, although as described above, the samples used to determine the mean are consecutive in time, in other embodiments, non-consecutive samples are used to determine a mean.

Figure 4:
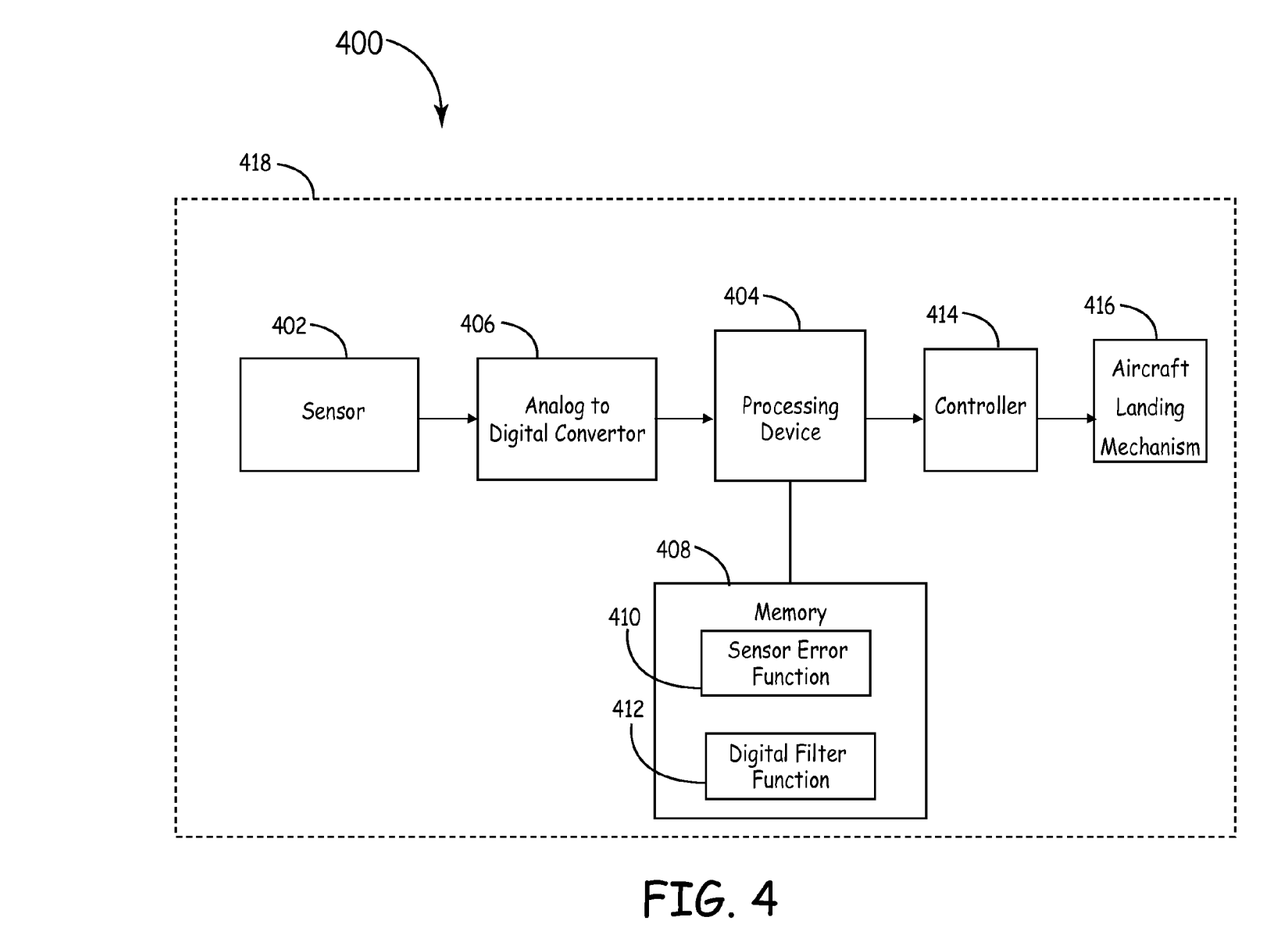
FIG. 4 is a block diagram of one embodiment of a system for identifying erroneous sensor outputs.

Referring now to FIG. 4, a block diagram of one embodiment of a system 400 for identifying erroneous sensor outputs is provided. System 400 includes a sensor 402, a sample and hold circuit 406, a processing device 404, a memory 408, and program code 410 which as substantially similar to those described with respect to FIG. 1. System 400 also includes program code for a digital filter 412, a controller 414, and an aircraft landing mechanism 416.

In this embodiment, system 400 is installed in an aircraft 418 and used to assist in landing aircraft 418. In this embodiment, sensor 402 is an acoustic proximity sensor and is mounted on aircraft 418 and used to determine a distance from aircraft 418 to the ground. Thus, the samples after being processed to determine whether they are erroneous are used by an aircraft control system 414 to control aircraft landing mechanism 416 in order to assist in landing aircraft 418.

Here, sensor 402 is an acoustic sensor which transmits acoustic pulses and detects return echo pulses from the transmitted pulses. The acoustic sensor measures an amount of time passed from when the acoustic pulse was transmitted until when a return pulse is received. The acoustic sensor then outputs a voltage level representing this time measurement. For example, in one embodiment, a time measurement of 5 microseconds results in an output of 3 volts, and a time measurement of 10 microseconds results in an output of 4 volts. This time measurement is provided (possibly after conversion by a sample and hold circuit) as a digital sample to processing system 404. The samples are processed (at processing device 404, for example) to determine a distance from sensor 402 to the object from which the return pulse was reflected. In one embodiment, during normal operation, processing system 404 receives samples on a periodic basis, for example, one sample every 1/10 of a second.

In one embodiment, after the samples have been analyzed by processing device 404 to determine whether the samples are erroneous, the samples are further processed depending upon the application of sensor 402. For example, in one embodiment, the samples are further processed by being filtered by digital filter 412. Examples of digital filter 412 include a simple averaging type filter and a more sophisticated Kalman type filter. Digital filter 412 smoothes the sampled data to provide a more realistic portrayal of the actual value being sensed.

The digitally filtered data is then used by controller 414 to control aircraft landing mechanism 416. Although in this embodiment, the further processing is performed by processing device 104, in another embodiment, the further processing is performed by a separate processing device or devices (not shown). Examples of digital filters 412 and controller 414 to control aircraft landing mechanisms are provided in U.S. patent application Ser. No. 12/332,481 filed on Dec. 11, 2008 and owned by the present assignee, and which is hereby incorporated herein by reference.

As mentioned above, in one embodiment, processing device 404 performs multiple functions in addition to identifying erroneous data from sensor 402. Here, the function of identifying erroneous samples, along with the other functions of processing device 404, are carried out by software operating on processing device 404. In this embodiment, processing device 404 comprises a general purpose processor coupled to a memory device containing the software that operates on the processor. In another embodiment, processing device 404 is a microprocessor that is programmed solely to identify erroneous samples from sensor 402.

In either case, in one embodiment, method 200 is implemented in processor readable instructions, such as program modules or applications, which are executed by processing device. Generally, program modules or applications include routines, programs, objects, data components, data structures, algorithms, and the like, which perform particular tasks or implement particular abstract data types. These represent examples of program code for executing steps of the methods disclosed herein. The particular sequence of such executable instructions or associated data structures represent examples of corresponding acts for implementing the functions described in such steps.

Advantageously, identifying erroneous data improves the accuracy of subsequently processed data by taking into account the erroneous data during subsequent processing. Furthermore, using a sliding window enables the threshold to take into account changes in the sensor outputs. Thus, instead of having a threshold that is fixed at a certain data point, the threshold is based on a divergence from the mean. Since the mean is not locked at a single value, and is instead determined based on a temporally varying plurality of the preceding samples, the mean takes into account changes in the sample data. This is because the mean is based on only the samples within the window. Older samples taken when the sensor may have been measuring a different physical quantity are automatically factored out of the mean calculation by the sliding window.

Finally, identifying erroneous sensor outputs based on a mean of preceding samples does not introduce lag into the sample stream from the sensor, because the decision of whether the output is erroneous relies only on previously obtained data, not on future data.

In one embodiment, instructions for carrying out the various process tasks, and calculations other data used in the operation of the methods described above are implemented in a program product including software, firmware, or other processor readable instructions. These instructions are stored on any appropriate processor readable medium used for storage of processor readable instructions or data structures. Such processor readable media is any available media that can be accessed by a general purpose or special purpose computer or processor, or any programmable logic device.

Suitable processor readable media comprises, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of processor executable instructions or data structures. Any of the foregoing may be supplemented by, or incorporated in, specially-designed Application Specific Integrated Circuits (ASICs) or Field Programmable Gate Arrays (FPGAs). When information is transferred or provided over a network or another communications connection (either hardwired, wireless, or a combination of hardwired and wireless) to a processor, the processor properly views the connection as a processor readable medium. Thus, any such connection is properly termed a processor readable medium. Combinations of the above are also included within the scope of processor readable media.

Although specific embodiments have been illustrated and described herein, it will be appreciated by those of ordinary skill in the art that any arrangement, which is calculated to achieve the same purpose, may be substituted for the specific embodiment shown. This disclosure is intended to cover any adaptations or variations of the inventions herein. Therefore, it is manifestly intended that the inventions herein be limited only by the claims and the equivalents thereof.

What is claimed is:

1. A method for identifying erroneous sensor outputs, the method comprising:
    with a processing device, obtaining a first plurality of samples from a sensor over a period of time;
    determining, with the processing device, a first mean of the first plurality of samples;
    with the processing device, obtaining a first additional sample from the sensor at a time subsequent to times that the first plurality of samples were obtained;
    determining, with the processing device, a divergence of the first additional sample from the first mean;
    identifying, with the processing device, the first additional sample as erroneous when the divergence is greater than a threshold;
    determining a second mean of a second plurality of samples including the first additional sample when the first additional sample has been identified as erroneous; and
    controlling a mechanism based on only non-erroneous samples obtained from the sensor.

2. The method of claim 1, further comprising:
    flagging the first additional sample when the first additional sample has been identified as erroneous.

3. The method of claim 1, wherein the first additional sample is a sample immediately subsequent to a sample obtained last in time of the first plurality of samples.

4. The method of claim 3, wherein
    the second plurality of samples includes each of the first plurality of samples, except for a sample obtained first in time of the first plurality of samples, the second plurality of samples including the first additional sample, the method further comprising:
    with the processing device, obtaining a second additional sample from the sensor at a time subsequent to a time that the first additional sample was obtained;
    determining with the processing device, a second divergence of the second additional sample from the second mean; and
    identifying with the processing device, the second additional sample as erroneous when the second divergence is greater than the threshold.

5. The method of claim 1, wherein the samples of the first plurality of samples are consecutive in time.

6. The method of claim 1, wherein determining a divergence comprises determining a coefficient of variance for the first additional sample with respect to the first mean.

7. The method of claim 1, further comprising discarding the first additional sample for further processing except for determination of the second mean when the first additional sample has been identified as erroneous.

8. A system comprising:
    a sensor; and
    a processing device communicatively coupled to the sensor and configured to:
        determine a first mean of a first plurality of samples, each of the samples of the first plurality of samples comprising data obtained by the sensor over a period of time;
        determine a divergence between a first additional sample obtained by the sensor at a time subsequent to the period of time and the first mean;
        identify the first sample as erroneous when the divergence is greater than a threshold;
        determine a second mean of a second plurality of samples including the first additional sample when the first additional sample has been identified as erroneous; and
        control a mechanism based on only non-erroneous samples obtained from the sensor.

9. The system of claim 8, wherein the sensor is an acoustic proximity sensor.

10. The system of claim 8, further comprising:
    a sample and hold circuit coupled between the sensor and the processing device, the sample and hold circuit configured to convert analog outputs from sensor to digital samples for the processing device.

11. The system of claim 8, wherein the processing device is further configured to:
    flag the first additional sample when the first additional sample has been identified as erroneous.

12. The system of claim 8, wherein the second plurality of samples includes each of the first plurality of samples, except for a sample obtained first in time of the plurality of samples, the second plurality of samples including the first additional sample, and the processing device is further configured to:
    obtain a second additional sample from the sensor at a time subsequent to a time that the first additional sample was obtained;
    determine a second divergence of the second additional sample from the second mean; and
    identify the second additional sample as erroneous when the second divergence is greater than the threshold.

13. The system of claim 8, further comprising:
a memory device comprising software embodied thereon, the software operable to instruct the processing device to:
determine the first mean of the first plurality of samples;
determine the divergence between the first additional sample and the first mean; and
identify the first sample as erroneous when the divergence is greater than the threshold.

14. The system of claim 8, wherein the processing device is configured to discard the first additional sample for further processing except for determination of the second mean when the first additional sample has been identified as erroneous.

15. The system of claim 8, wherein the processing device is configured to determine the divergence between the first additional sample and the first mean by at least determining a coefficient of variance for the first additional sample with respect to the first mean.

16. A non-transitory processor-readable medium comprising instructions, that when executed by a processor, cause the processor to:
for a first plurality of samples obtained from a sensor, determine a first mean of a portion of the first plurality of samples using a sliding window;
for a new sample obtained from the sensor, determine a divergence between the new sample and the first mean of the samples within the sliding window;
identify the new sample as erroneous when the divergence is greater than a threshold;
determine a second mean of a second plurality of samples including the new sample when the new sample has been identified as erroneous; and
control a mechanism based on only non-erroneous samples obtained from the sensor.

17. The non-transitory processor-readable medium of claim 16, wherein for each new sample, the sliding window contains samples immediately preceding the new sample.

18. The non-transitory processor-readable medium of claim 16, wherein the instructions, when executed by the processor, cause the processor to
determine the divergence by determining a coefficient of variance for the new sample with respect to the first mean.

19. The non-transitory processor-readable medium of claim 16, wherein the sensor is an acoustic proximity sensor and each sample comprises data relating to a distance from the sensor to an object.

20. The non-transitory processor-readable medium of claim 16, wherein the instructions, when executed by the processor, cause the processor to discard the new sample for further processing except for calculation of the second mean when the divergence is greater than a threshold.

* * * * *

UNITED STATES PATENT AND TRADEMARK OFFICE
CERTIFICATE OF CORRECTION

| | |
|---|---|
| PATENT NO. | : 8,359,178 B2 |
| APPLICATION NO. | : 12/398041 |
| DATED | : January 22, 2013 |
| INVENTOR(S) | : Rowe et al. |

Page 1 of 1

It is certified that error appears in the above-identified patent and that said Letters Patent is hereby corrected as shown below:

In the Claims

Claim 8, col. 8, line 38: "identify the first sample" should be changed to --identify the first additional sample--

Signed and Sealed this
Third Day of September, 2013

Teresa Stanek Rea
*Acting Director of the United States Patent and Trademark Office*